US010337600B2

(12) United States Patent
Ture (10) Patent No.: US 10,337,600 B2
(45) Date of Patent: Jul. 2, 2019

(54) SCALABLE IN-SITU GEAR BOX AND POWERTRAIN LUBRICANT MONITORING SYSTEMS AND METHODS

(71) Applicant: Sikorsky Aircraft Corporation, Stratford, CT (US)

(72) Inventor: Cody M. Ture, Fairport, NY (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 474 days.

(21) Appl. No.: 15/191,654

(22) Filed: Jun. 24, 2016

(65) Prior Publication Data

US 2017/0002921 A1 Jan. 5, 2017

Related U.S. Application Data

(60) Provisional application No. 62/187,008, filed on Jun. 30, 2015.

(51) Int. Cl.
*F16H 57/04* (2010.01)
(52) U.S. Cl.
CPC ..... *F16H 57/0405* (2013.01); *F16H 57/0404* (2013.01)
(58) Field of Classification Search
CPC ........................ F16H 57/0402; F16H 57/0405
USPC ................................................. 210/739, 767
See application file for complete search history.

(56) References Cited

U.S. PATENT DOCUMENTS

| 5,610,341 | A  | * | 3/1997  | Tortora ............... F01D 17/02 73/756 |
| 7,442,291 | B1 | * | 10/2008 | Discenzo ............ B01D 35/143 210/443 |
| 9,752,956 | B2 | * | 9/2017  | McKimpson ....... G01M 13/021 |
| 2003/0132740 | A1 | * | 7/2003  | Stone ................ G01N 33/2858 324/71.4 |
| 2009/0014245 | A1 | * | 1/2009  | Shevchenko ........... F01D 21/10 184/6.4 |
| 2009/0115416 | A1 | * | 5/2009  | White .................... G01N 24/08 324/316 |
| 2011/0267603 | A1 | * | 11/2011 | Shaw .................. G01N 21/431 356/128 |
| 2017/0082188 | A1 | * | 3/2017  | McKimpson ........... F16H 57/01 |
| 2017/0248572 | A1 | * | 8/2017  | Byington ............... F16C 19/52 |
| 2017/0363529 | A1 | * | 12/2017 | Ture ................... G01N 15/0656 |

(Continued)

*Primary Examiner* — Ellen M McAvoy
(74) *Attorney, Agent, or Firm* — Cantor Colburn LLP (57) ABSTRACT

Disclosed is an apparatus for in-situ filtering and monitoring of a lubricating fluid which includes, among other elements, a housing, a filter assembly and a lubrication monitoring module. The housing is adapted for being secured directly to a source of lubricating fluid and defines an internal filter chamber. The filter assembly is positioned at least partially within the internal filter chamber of the housing and the lubrication monitoring module is in fluid communication with the internal filter chamber of the housing. The filter assembly and the lubrication monitoring module are arranged so as to create first and second flow paths for lubricating fluid within the housing. The first flow path directs a portion of the lubricating fluid from the source, through the filter assembly where it is conditioned and returned to the source. The second flow path directs a second portion of the lubricating fluid from the source to the lubrication monitoring module and subsequently it is returned to the source.

16 Claims, 4 Drawing Sheets

(56) References Cited

U.S. PATENT DOCUMENTS

2018/0024106 A1\* 1/2018 Roman .............. G01N 33/2858
                                                    356/318
2018/0031107 A1\* 2/2018 Howard ............. G01N 33/2888
2018/0051793 A1\* 2/2018 Ture ....................... F01M 11/10

\* cited by examiner

SCALABLE IN-SITU GEAR BOX AND POWERTRAIN LUBRICANT MONITORING SYSTEMS AND METHODS

CROSS REFERENCE TO RELATED APPLICATION

This application claims priority to and benefit of U.S. Provisional Patent Application No. 62/187,008, filed Jun. 30, 2015, which is incorporated by reference herein in its entirety.

STATEMENT REGARDING FEDERALLY SPONSORED RESEARCH OR DEVELOPMENT

This invention was made with Government support with the United States Army under Contract No. W911W6-11-2-0008. The Government therefore has certain rights in this invention.

BACKGROUND OF THE INVENTION

1. Field of the Invention

The subject disclosure relates to the field of fluid analysis, and more particularly, to a novel filter bowl design that enables in-situ lubricant monitoring systems to be retrofitted in a scalable fashion to existing gearboxes and powertrain systems.

2. Background of the Related Art

Aircraft mechanical components require wear protection fluids such as drive train lubricants and engine oils to keep the aircraft components operating in the most efficient and safe manner possible. Lubricating fluids can become degraded or contaminated by internal or external sources or accumulate component wear debris due to pitting, spalling, corrosion-induced fatigue, or other mechanisms. Further, water infiltration or chemical changes can degrade the lubricant and can affect oil-wetted component lifetimes and maintenance requirements.

Lubricant monitoring of mechanical components is being widely used for diagnostic and prognostic assessment of the health of these mechanical components. In-situ lubricant monitoring devices need to operate in harsh environments, especially in aircraft, rotorcraft, and industrial applications. Two typical lubricant monitoring techniques include lubricant condition analysis and detection of metallic debris suspended in lubricant flow.

Evaluating debris in hydraulic, lubrication and other fluid systems can provide valuable information about abnormal contaminant ingression, accelerated component wear, impending component failure and/or fluid break down. However, integrating fluid monitoring hardware into systems for which they were not designed can be logistically complex, resulting in high NRE costs that have slowed the adoption of in-situ lubricant monitoring. For example, in many rotorcraft gearbox lubrication systems access to unfiltered oil, as required to perform lubricant monitoring, is only available at the main filter assemblies. Moreover, in helicopters such as the H-60, clearance between the transmission and airframe or cabin needed to support the installation of sensor hardware is extremely limited.

Therefore, there is a need for a system to reduce the cost and complexity associated with integrating fluid monitoring hardware on existing rotorcraft powertrain systems with minimal impact on size and weight.

SUMMARY OF THE INVENTION

The present disclosure is directed to an apparatus for in-situ filtering and monitoring of a fluid which includes, inter alia, a housing, a filter assembly and a monitoring module. The housing is adapted for being secured directly to a source of fluid and defines an internal filter chamber. The filter assembly is positioned at least partially within the internal filter chamber of the housing. The monitoring module is connected to the housing and fluid can flow from the internal filter chamber of the housing to within the monitoring module. The monitoring module includes a sensor which outputs a fluid condition signal indicating a condition of the fluid in the monitoring module.

The filter assembly and the lubrication monitoring module are arranged so as to create parallel flow paths, hereby designated as first and second flows for lubricating fluid within the housing. The first flow path functions in an identical fashion to an unmodified filter bowl, directing the majority of the lubricating fluid from the source, through the filter assembly where it is conditioned and returned to the source. It is envisioned that the filter assembly can include a single stage or multi-stage filter.

The second flow path directs or diverts a second portion of the lubricating fluid away from the first path temporarily, diverting it to the lubrication monitoring module where useful prognostic information can be ascertained. The lubricant is subsequently returned to the filter assembly where it is conditioned and returned to the source.

It is envisioned that the apparatus can further include a sealing element positioned between a radially outer surface of the filter assembly and the housing to generate a back-pressure within the filter chamber so as to force the second portion of the fluid into the second flow path. As a result, the fluid interface to the gearbox remains the same (i.e., is not modified in any way) as it does in arrangement that include the OEM filter bowl.

In certain embodiments the sensor in the monitoring module includes a debris monitor assembly to determine wear debris information in fluid traversing the second flow path. Alternatively, the fluid is a lubricant and the sensor in the monitoring module includes a lubricant condition monitor assembly to determine lubricant condition information in the lubricant traversing the second flow path.

Embodiments of the disclosed apparatus can include a second monitoring module in fluid communication with the filter chamber of the housing and arranged so as to define a third parallel flow path for fluid within the housing. The third flow path directs a third portion of the fluid from the source to the second monitoring module before being returned to the filter assembly where it is conditioned and returned to the source. In certain embodiments, the apparatus includes four monitoring modules. Those skilled in the art will readily appreciate that any number of lubrication monitoring modules can be employed without departing from the scope of the present disclosure.

The debris monitor assembly can include a sensing element that obtains the wear debris information, the sensing element including one or more of an inductive coil, an optical sensing element, a magnetic sensing element and an acoustical sensing element.

It is envisioned that the housing comprises a first flange at a first end to couple the housing directly to the source of lubricating fluid. Alternative techniques for attaching the housing to the source, such as the gearbox, can be deployed without departing from the scope of the present disclosure. The apparatus of the present disclosure can attach to the source in the same manner as the original filter assembly or filter bowl.

In embodiments of the present disclosure, the lubricant condition monitor assembly is configured to determine at least one of water content, incorrect lubricant addition, lubricant oxidation degradation, additive depletion, or viscosity.

In certain rotorcraft embodiments of the present disclosure, the fluid is a lubricant from a gearbox of a vehicle, such as a rotorcraft.

The present disclosure is further directed to a scalable in-situ filtering and monitoring apparatus which includes, among other elements, a housing that is adapted for being secured directly to a source of lubricating fluid and defines an internal filter chamber; a filter assembly positioned at least partially into the internal filter chamber of the housing for conditioning lubricating fluid directed across at least one filter element associated with the filer assembly; a lubrication monitoring module in fluid communication with the internal filter chamber of the housing for evaluating a portion of the lubricating fluid passing through the monitoring module; and a backpressure generating feature for directing a portion of the lubricating fluid received from the source to the lubricating monitoring module.

The filter assembly and the lubrication monitoring module can be arranged so as to create first and second flow paths for lubricating fluid within the housing. The first flow path directs a portion of the lubricating fluid from the source, through the filter assembly where it is conditioned and returned to the source in an identical fashion as an unmodified filter assembly. The second flow path directs or diverts a second portion of the lubricating fluid from the source to the lubrication monitoring module and subsequently through the filter assembly where it is conditioned and returned to the source.

In certain embodiments the lubrication monitoring module includes a debris monitor assembly to determine wear debris information in a lubricant traversing the second flow path. Alternatively, the lubrication monitoring module can include a lubricant condition monitor assembly to determine lubricant condition information in the lubricant traversing the second flow path.

Embodiments of the disclosed apparatus include a second lubrication monitoring module in fluid communication with the internal filter chamber of the housing and arranged so as to define a third flow path for lubricating fluid within the housing. The third flow path directs a third portion of the lubricating fluid from the source to the second lubrication monitoring module and subsequently through the filter assembly where it is conditioned and returned to the source. In certain embodiments, the apparatus includes four lubrication monitoring modules. Those skilled in the art will readily appreciate that any number of lubrication monitoring modules can be employed without departing from the scope of the present disclosure.

In certain embodiments, the housing includes a first flange at a first end to couple the housing directly to the source of lubricating fluid.

In certain applications the lubricating fluid is a lubricant from a gearbox of a vehicle.

The present disclosure is further directed to a method for in-situ filtering and monitoring of a fluid using a filtering and monitoring apparatus which includes: a housing defines an internal filter chamber; a filter assembly inserted at least partially into the internal filter chamber of the housing; and a monitoring module in fluid communication with the internal filter chamber of the housing.

An embodiment of the method includes directing a portion of the fluid over a first flow path which extends from a source through the filter assembly where it is conditioned and returned to the source; and directing a second portion of the fluid over a second flow path which extends from the source to the monitoring module where it is evaluated and returned to the source and which includes a sensor sending the second portion of the fluid; and In certain embodiments, a fluid condition signal indicating a condition of the fluid in the monitoring module is provided by the sensor.

It is envisioned that a sealing element can be provided between a radially outer surface of the filter assembly and the housing to generate a backpressure within the filter chamber so as to force the second portion of the fluid into the second flow path.

Moreover, wear debris information in the fluid traversing the second flow path can be determined using a debris monitor assembly associated with the sensor in the monitoring module.

In certain embodiments, the disclosed method can include the steps of providing a lubricant condition monitor assembly with the sensor in the monitoring module and wherein the fluid comprises a lubricant; and determining lubricant condition information in the lubricant traversing the second flow path.

It is envisioned that the filtering and monitoring apparatus can be directly to a source of fluid. In certain applications, a non-monitoring filter bowl assembly is removed from a source of fluid; and the filtering and monitoring apparatus is secured directly to the source of fluid in a same location as the non-monitoring filter bowl assembly.

These and other unique features of the systems and methods disclosed herein will become more readily apparent from the following description and the accompanying drawings.

BRIEF DESCRIPTION OF THE DRAWINGS

So that those having ordinary skill in the art to which the disclosed systems and methods appertain will more readily understand how to make and use the same, reference may be had to the drawings wherein.

DETAILED DESCRIPTION OF PREFERRED EMBODIMENTS

Reference will now be made to the drawings wherein like reference numerals identify similar structural features or aspects of the subject disclosure. Exemplary embodiments are described with reference to a lubricant monitoring apparatus for use with a gearbox of a rotorcraft. It is understood that embodiments may more generally apply to a fluid condition or debris monitoring device for use with a variety of systems, such as hydraulic systems, coolant systems, etc. Therefore, although embodiments are described with reference to a lubricant monitoring apparatus, it is understood that embodiments of the invention are not intended to be limited to the analysis of lubricants, but may apply to a variety of fluids.

Figure 1:
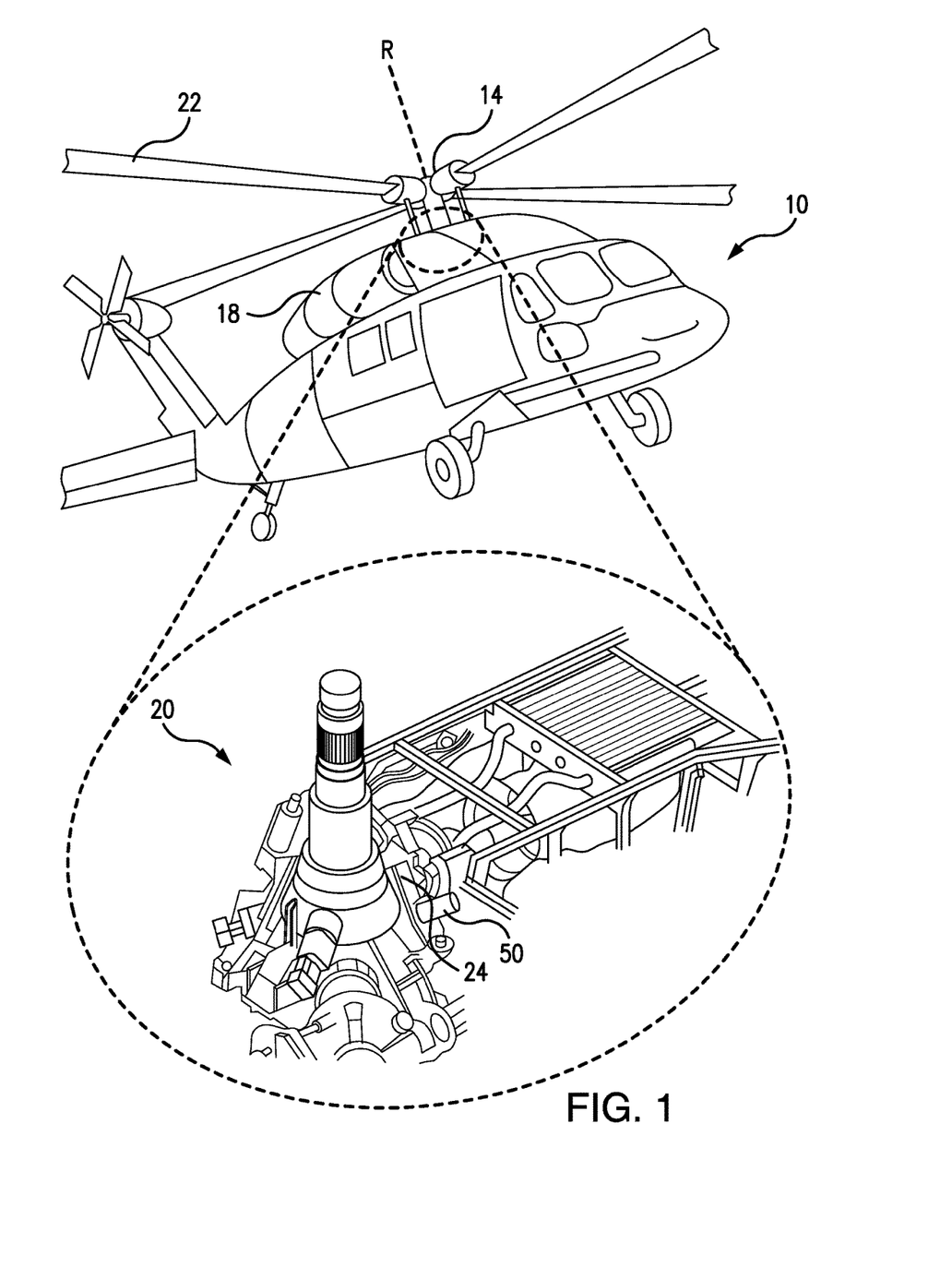
FIG. 1 illustrates a vehicle and a gearbox in an exemplary embodiment.

FIG. 1 illustrates an exemplary rotary wing aircraft 10 having a gearbox 20 with a lubricant filtering and monitoring device 50 that filters and monitors the condition of the gearbox lubricant and provides lubrication condition information. Lubricant may include oils or other lubricating fluids. Although embodiments are described with reference to lubricant monitoring, the lubricant filtering and monitoring device 50 may be used with other fluids (e.g., coolants, transmission fluids, etc.) and may be more generally referred to as a fluid monitoring device.

Exemplary aircraft 10 includes a main rotor assembly 14 that is driven about an axis of rotation R by one or more engines 18. The main rotor assembly includes a multiple of rotor blades 22 mounted to rotor assembly 14 that are driven for rotation about axis R through a main gearbox 20. Lubricant filtering and monitoring device 50 may provide lubricant condition monitoring via a single, ruggedized, device which is secured directly to the gearbox 20.

As will be describe in detail below, lubricant filtering and monitoring device 50 is coupled to housing 24 of main gearbox 20. As a result, lubricant filtering and monitoring device 50 provides in-line, real-time monitoring of lubricant with main gearbox 20.

Figure 2:
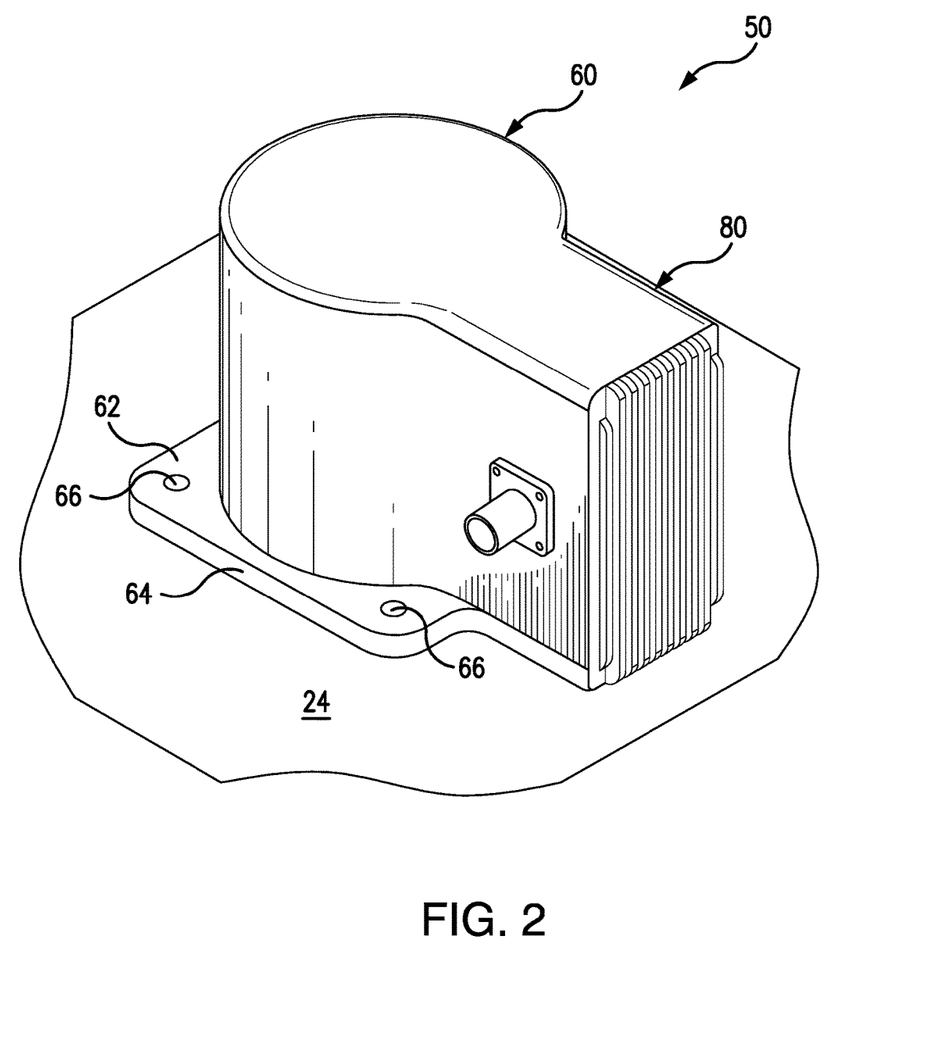
FIG. 2 is a perspective view take from above of an exemplary embodiment of an in-situ filtering and monitoring apparatus of the present disclosure.
Figure 3:
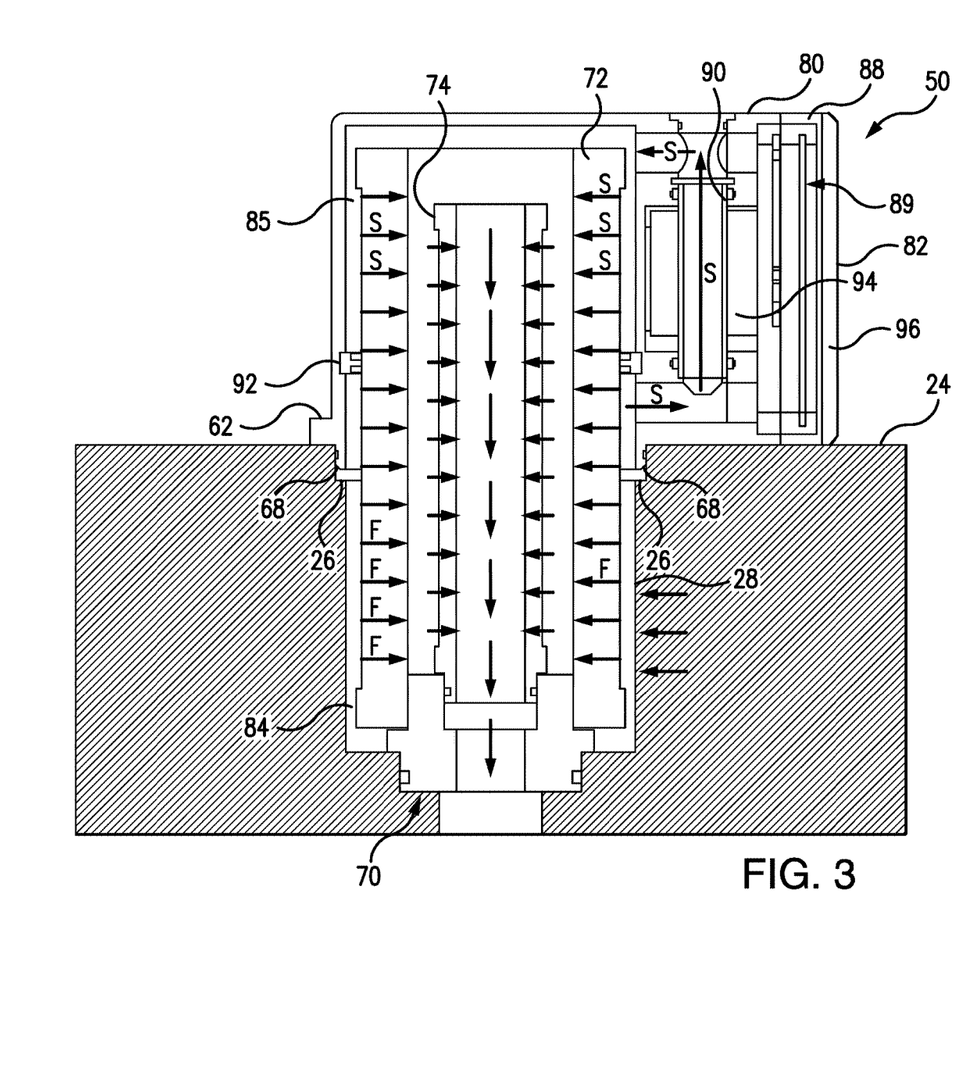
FIG. 3 is a cross-sectional view of the filtering and monitoring apparatus of FIG. 2.

With reference to FIGS. 2 and 3, which illustrate a filter and monitoring apparatus which has been constructed in accordance with an embodiment of the present disclosure and identified using reference numeral 50. Filtering and monitoring apparatus 50 includes a housing 60, a filter assembly 70 and a lubrication monitoring module 80. The housing 60 is secured directly to gearbox housing 24, which is the source of the lubricating fluid. In the embodiment shown in this figure, the housing 60 includes a first flange 62 at a first end 64 to couple the housing 60 directly to the gearbox 20. Alternative techniques for attaching the housing 60 to a source, such as the gearbox, can be deployed without departing from the scope of the present disclosure.

While not required in all aspects, an embodiment of the filter and monitoring apparatus 50 can be adapted and configured to replace an original filter bowl assembly provided with gearbox 20. Therefore, apparatus 50 is ideally equipped with mounting structure that mates with the existing bolt pattern formed on housing 24 of gearbox 20 which bolts a filter bowl lacking the apparatus 50 to the housing 24. As shown, flange 62 includes apertures 66 for receiving bolts (not shown) that secure filter and monitoring apparatus 50 to gearbox housing 24.

The first end 64 of the housing 60 is also provided with a shoulder 68 which is received within a corresponding bore 26 formed in the gearbox housing 24. Shoulder 68 has a circumferential groove formed in its outer periphery which is designed to receive a sealing element (not shown), and create a fluid-tight seal between housing 60 and gearbox 20.

With reference to FIG. 3, filter assembly 70 is positioned within an internal filter chamber 61 of the housing 60 and lubrication monitoring module 80 is arranged in fluid communication with internal filter chamber 61. As shown in this figure, the casing 82 for module 80 is part of the housing 60 (i.e., a unitary structure). However, those skilled in the art will readily appreciate that the casing 82 for module 80 can be formed as a separate element which is secured to the housing 60 using a variety of known techniques.

Filter assembly 70 and lubrication monitoring module 80 are arranged within housing 60 so as to create first (F) and second (S) flow paths for lubricating fluid within housing 60. The lubricating fluid received from the supply/gearbox is initially provided to a lower circumferential gap 84 formed between a first stage filter 72 associated with filter assembly 70 and a cylindrical wall 28 which forms part of a well provided in gearbox housing 26. In the first flow path (F) a portion of the lubricating fluid is directed from within the circumferential gap through the first stage filter 72 and a second stage filter 74 where it is conditioned and returned to the source.

In the second flow path (S) a second portion of the lubricating fluid is directed from the source to the lubrication monitoring module 80. In the embodiment shown in FIG. 3, lubrication monitoring module 80 includes a debris monitor 88. Debris monitor 88 includes a sensing assembly 89 that obtains the wear debris information. The sensing assembly 89 includes an inductive coil 94, a sensing element 96. As will be discussed below, sensing element 96 may include one or more optical sensing elements, magnetic sensing elements and an acoustical sensing element.

The fluid received within monitoring module 80 passes through a tube 90 associated with debris monitor 88 and then is provided to an upper circumferential gap 85 formed between the first stage filter 72 and wall 28. This fluid is then passed through the first stage filter 72 and a second stage filter 74 where it is conditioned and returned to the source.

A wiper seal 92 is positioned within the housing 60 so as to create a pressure gradient along the filter element and a small amount of backpressure to push a portion of the flow through the second flow path (S). As will be appreciated, fluid will flow through second flow path (S) due to the pressure differential in the filter chamber. The pressure differential will likely initially be small and will increase as the lower portion of the filter accumulates particulate faster than the accumulation in the upper portion. Those skilled in the art will readily appreciate that other techniques can be used to force or urge a portion of the fluid to traverse the second flow path without departing from the inventive aspects of the present disclosure.

As discussed above, lubrication monitoring module 80 includes a debris monitor 88 to determine wear debris information in a lubricant traversing the second flow path (S). However in alternative embodiments, the lubrication monitoring module 80 can include a lubricant condition monitor assembly to determine lubricant condition information in the lubricant traversing the second flow path (S).

Figure 4:
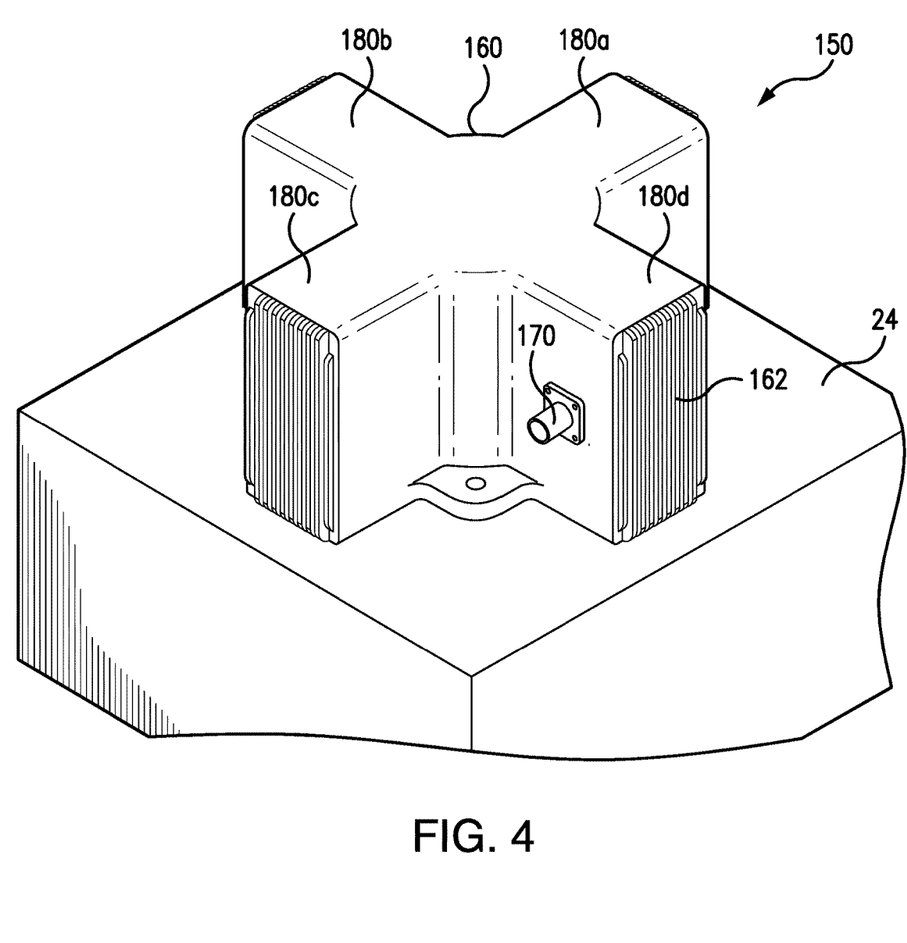
FIG. 4 is a perspective view of a second exemplary embodiment of an in-situ filtering and monitoring apparatus of the present disclosure.

Referring now to FIG. 4, which illustrates a further embodiment of the filter and a monitoring apparatus of the present disclosure which has been designated as reference numeral 150. Filter and monitoring apparatus 150 includes four lubrication monitoring modules 180a-180d. In a similar manner to the previously described embodiment, the monitoring modules 180a-d are arranged in fluid communication with the internal filter chamber of housing 160 and positioned so as to define, second, third, fourth and fifth flow paths for lubricating fluid within housing 160. Those skilled in the art will readily appreciate that any number of lubrication monitoring modules can be employed without departing from the scope of the present disclosure.

As shown in FIG. 4, the housing 160 can include a plurality of fin elements 162 which assist with cooling the electronics associated with the debris or condition monitors. Electrical ports 170 can also be provide which allow internal components of the debris or condition monitors to be connected to hardware exterior to the housing 160.

As noted above, one or more of the lubrication monitoring modules can include a debris monitor. Debris monitors can include one or more of a sensing element, analog circuitry, analog-to-digital converter(s), and/or digital processing circuitry. An exemplary sensing element is an inductive coil that surrounds a bore to create a magnetic field within the bore when excited by a high frequency alternating current. Alternatively, the sensing elements can include one or more of an optical sensing element, magnetic sensing element, acoustical sensing element, etc.

The inductive coil detects wear debris particles in the lubricant by detecting the interaction between particles and the inductive coil. A debris controller generates electric and magnetic fields in the inductive coil and includes a phase-sensitive demodulator for detecting real and imaginary impedance shifts in the bridge circuit caused by ferrous or non-ferrous wear debris particles. The electromagnetic inductance is represented in a real component of the sensed impedance signal and the magnetic flux reluctance is represented in the imaginary component of the sensed impedance signal. Ferrous and non-ferrous wear debris particles have different effects on the electric and magnetic fields of the inductive coil. As wear debris particles comprising ferrous and non-ferrous particles pass through the bore they modify the fields generated by the inductive coil, and produce unique signatures through coil imbalance that can be categorized based on the properties of the signal that is sensed. Also, a magnitude of the disruptive signal provides an approximate size of ferrous or non-ferrous particles in the lubricant flow.

To detect a size and type of wear debris particles, the debris monitor can include a debris controller housed within housing. Debris controller may be implemented as a microcontroller, DSP, microprocessor or similar device and includes a memory. The memory may store a debris detection algorithm as executable instructions for identifying ferrous and non-ferrous wear debris particles and count of wear debris particles in the lubricant. Also, the debris monitor can communicate wear debris information through an analog and/or digital communication interface to a communication controller for signal processing and communications.

As noted above, a lubricant condition monitor can be utilized within the filter and monitoring apparatus of the present disclosure. The lubricant condition monitor performs oil condition assessment of lubricant in main gearbox through a transducer in order to detect and classify lubricant quality factors such as water content, incorrect lubricant addition, lubricant oxidation degradation, additive depletion, or the like. Lubricant condition monitor may include one or more of a sensing element (e.g., transducer), analog circuitry, analog-to-digital converter(s), and/or digital processing circuitry.

The lubricant condition assessment system in lubricant condition monitor can use a low-powered Alternating Current ("AC") electrochemical impedance spectroscopy ("EIS") to extract features from the lubricant as it flows through bore. In an example, lubricant condition monitor uses a transducer to measure changes in the electrochemical response of the lubricant and estimates the change in specific aspects of lubricant health through a lubricity impedance model. The system electrochemically models the lubricant as a Randles circuit to assess changes in the dielectric properties and conductivity and fluid impedance of the lubricant as it degrades by aging (due to additive depletion, varnish accumulation, oxidation, or the like) or the presence of contaminants such as water or an incorrect lubricant.

The lubricant condition monitor can inject a multi-frequency AC voltage signal into the lubricant and measures the response at the frequency of the injected signal. The impedance of the lubricant can then be determined by comparing the differences between the injected signal and the response signal. In order to generate injection signals and process the received signals, the lubricant condition monitor includes a condition controller that is in communication with transducer. Condition controller may be implemented as a microcontroller, DSP, microprocessor or similar device and includes a memory. The memory may store a lubricant quality algorithm as executable instructions and models for interrogation and analysis of the received signal in order to detect and classify lubricant quality factors in the lubricant. Also, the condition controller may communicate information through an analog and/or digital communication interface to communication controller for signal processing and communications.

Those skilled in the art will appreciate that the filter and monitoring apparatus described herein is retrofittable in that it can be used to replace existing filter bowl assemblies. The design is also such that all flow and backpressure safeguards remain in place and there is minimal risk to the lubricating system. Moreover, the ability to add more monitoring modules to the apparatus allows the system to be scalable and monitor more of the flow.

The system can be modular to allow for a larger amount of lubricant to be sampled or to allow different sensor technologies to be employed/utilized. More specifically, the prognostic sensor technology can be customized to the aircraft's operating environment (i.e., a craft operating in the desert may need more debris monitoring while one operating at sea may need more corrosion/condition monitoring).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, aspects can be used in other types of aircraft, including fixed wing aircraft, industrial machinery, automobiles, maritime engines, locomotive engines, and the like. Additionally, while various embodiments of the invention have been described, it is to be understood that aspects of the invention may include only some of the described embodiments. By way of example, while described in the context of a lubricant, aspects of the invention could be used in other fluids whose condition is being monitored and which are filtered. Accordingly, the invention is not to be seen as limited by the foregoing description, but is only limited by the scope of the appended claims.

What is claimed is:

1. An apparatus for in-situ filtering and monitoring of a fluid, comprising:
   a housing which is adapted for being secured directly to a source of the fluid and defines an internal filter chamber;
   a filter assembly positioned at least partially in the internal filter chamber of the housing;
   a monitoring module in fluid communication with the internal filter chamber of the housing and which includes a sensor which outputs a fluid condition signal indicating a condition of the fluid in the monitoring module; and
   wherein the filter assembly and the lubrication monitoring module are arranged so as to create first and second flow paths for the fluid within the housing, the first flow path directing a first portion of the fluid from the source, through the filter assembly where it is conditioned and returned to the source, and the second flow path directing a second portion of the fluid that is less than the first portion from the source to the monitoring module and returned to the source.

2. The apparatus according to claim 1, further comprising a sealing element positioned between a radially outer surface of the filter assembly and the housing to generate a backpressure within the filter chamber so as to force the second portion of the fluid into the second flow path.

3. The apparatus according to claim 1, wherein the sensor in the monitoring module includes a debris monitor assembly to determine wear debris information in the fluid traversing the second flow path.

4. The apparatus according to claim 1, wherein the fluid comprises a lubricant and the sensor in the monitoring module includes a lubricant condition monitor assembly to determine lubricant condition information in the lubricant traversing the second flow path.

5. The apparatus according to claim 1, further comprising a second monitoring module in fluid communication with the internal filter chamber of the housing arranged so as to define a third flow path for the fluid within the housing, the third flow path directing a third portion of the fluid from the source to the second monitoring module and subsequently through the filter assembly where the third portion of the fluid is conditioned and returned to the source.

6. The apparatus according to claim 1, wherein the sensor comprises an inductive coil, an optical sensing element, a magnetic sensing element, an acoustical sensing element, or combinations thereof.

7. The apparatus according to claim 1, wherein the housing comprises a first flange at a first end to couple the housing directly to the source of fluid.

8. The apparatus according to claim 1, wherein the condition of the fluid in the monitoring module indicated in the fluid condition signal comprises water content, incorrect lubricant addition, lubricant oxidation degradation, additive depletion, viscosity or combinations thereof.

9. The apparatus according to claim 1, wherein the fluid is a lubricant from a gearbox of a vehicle.

10. A method for in-situ filtering and monitoring of a fluid using a filtering and monitoring apparatus which includes:
a housing defining an internal filter chamber;
a filter assembly inserted at least partially into the internal filter chamber of the housing; and
a monitoring module in fluid communication with the internal filter chamber of the housing, the method comprising:
directing a portion of the fluid over a first flow path which extends from a fluid source through the filter assembly where it is conditioned and returned to the source;
directing a second portion of the fluid, that is less than the portion, over a second flow path which extends from the source to the monitoring module where it is evaluated and returned to the source and which includes a sensor sending the second portion of the fluid; and
outputting from the sensor a fluid condition signal indicating a condition of the fluid in the monitoring module.

11. The method according to claim 10, further comprising generating a backpressure within the filter chamber so as to force the second portion of the fluid into the second flow path using a sealing element positioned between a radially outer surface of the filter assembly and the housing.

12. The method according to claim 10, further comprising determining wear debris information in the fluid traversing the second flow path using a debris monitor assembly associated with the sensor in the monitoring module.

13. The method according to claim 10, wherein the monitoring module includes a lubricant condition monitor assembly with the sensor and the fluid comprises a lubricant.

14. The method according to claim 13, further comprising determining lubricant condition information in the lubricant traversing the second flow path using the lubricant condition monitor assembly.

15. The method according to claim 10, further comprising:
securing the filtering and monitoring apparatus directly to a source of fluid.

16. The method according to claim 10, further comprising:
removing a non-monitoring filter bowl assembly from a source of fluid; and
securing the filtering and monitoring apparatus directly to the source of fluid in a same location as the non-monitoring filter bowl assembly.

* * * * *